Dec. 25, 1962  S. R. MANZARDO  3,070,235
KEY FILING SYSTEM
Filed Aug. 11, 1958  4 Sheets-Sheet 1
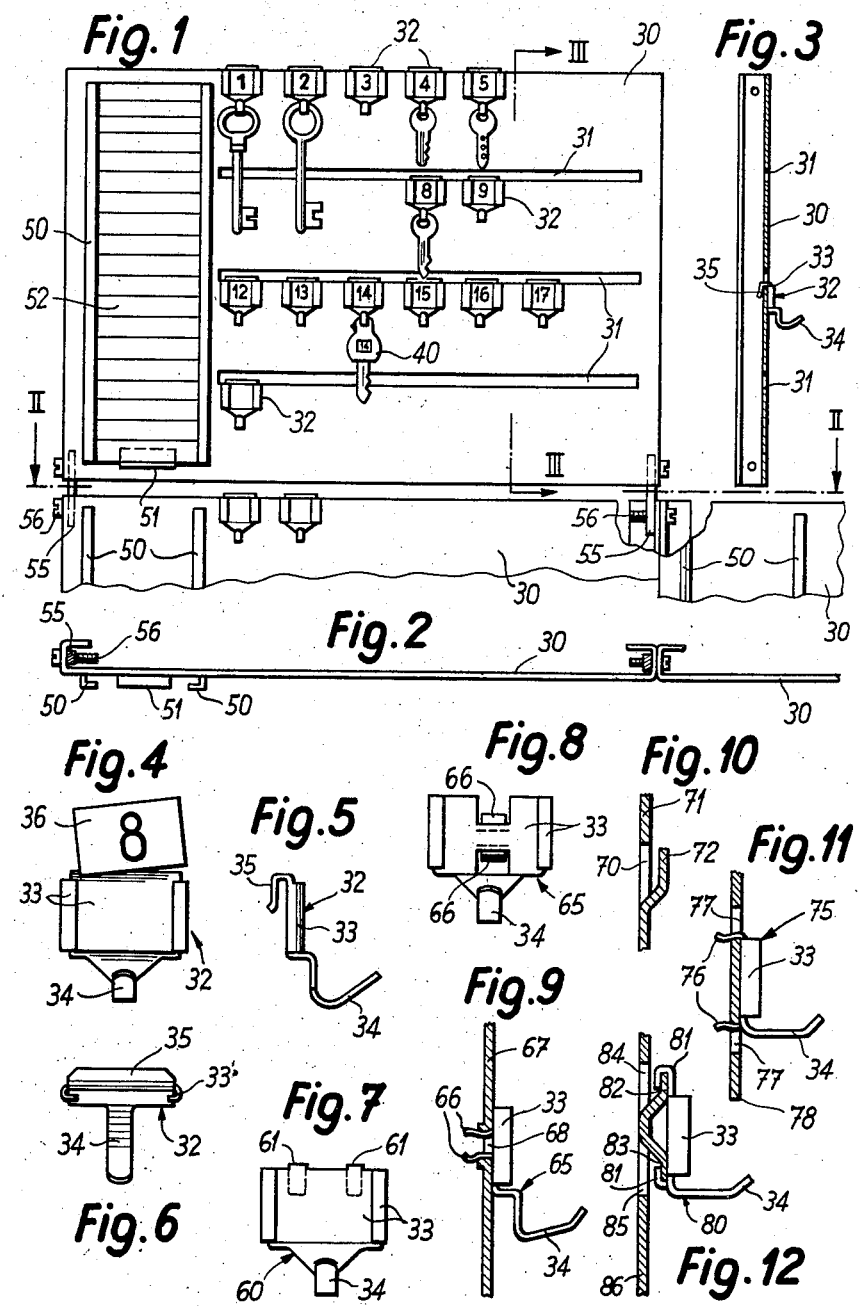
INVENTOR
SCIPIONE ROGER MANZARDO
BY Otto John Munz
ATTY

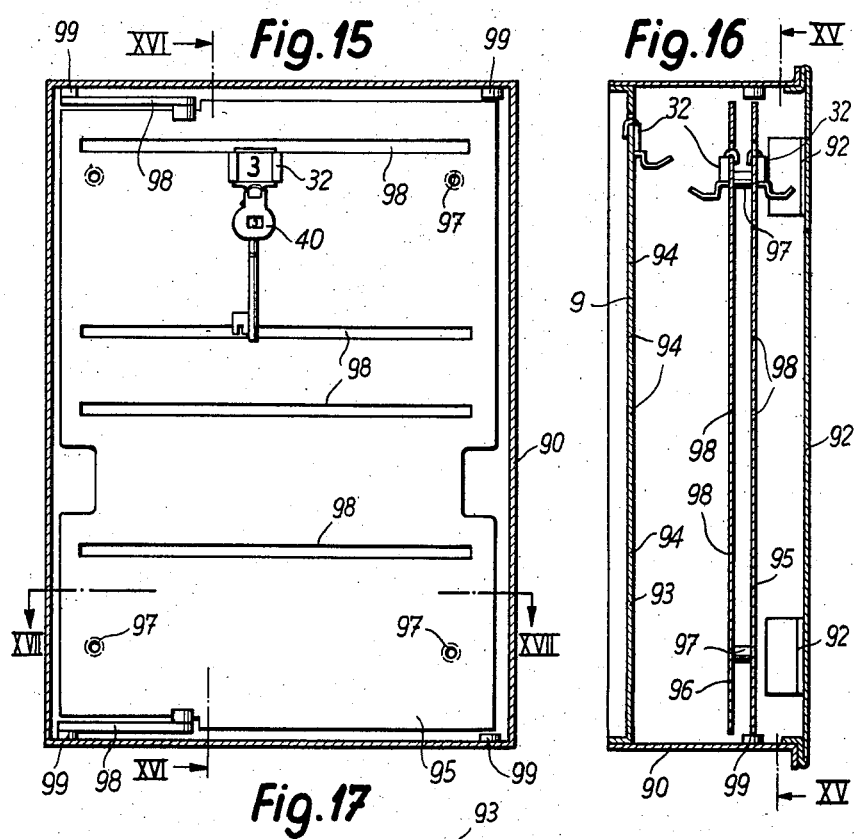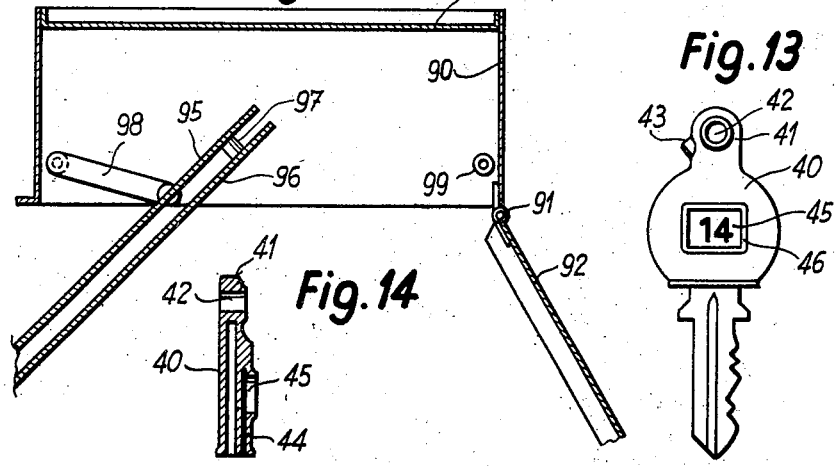

Dec. 25, 1962     S. R. MANZARDO     3,070,235
KEY FILING SYSTEM

Filed Aug. 11, 1958     4 Sheets-Sheet 3

INVENTOR
SCIPIONE ROGER MANZARDO
BY Otto John Munz
ATTY

Dec. 25, 1962 S. R. MANZARDO 3,070,235
KEY FILING SYSTEM
Filed Aug. 11, 1958 4 Sheets-Sheet 4
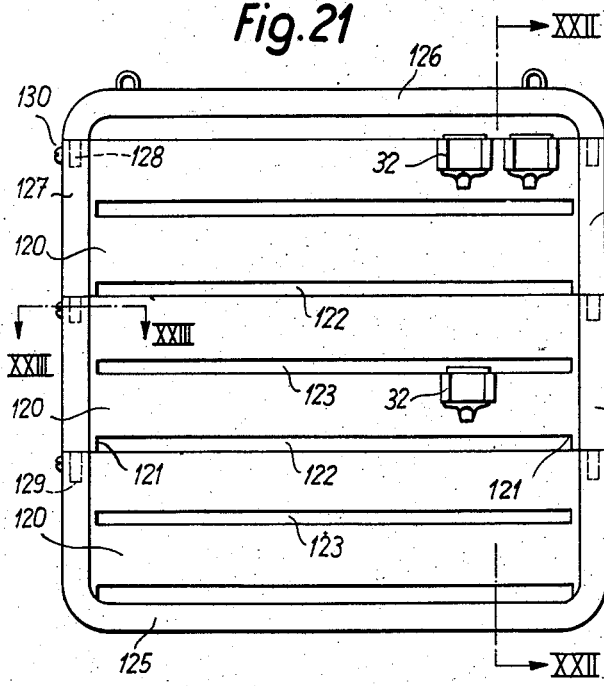
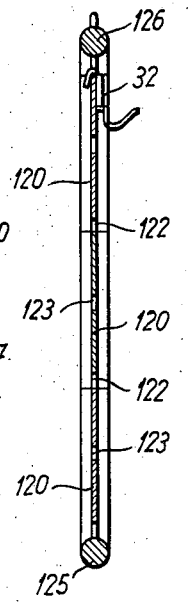
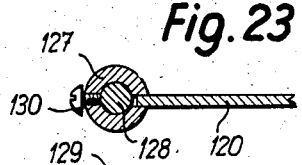
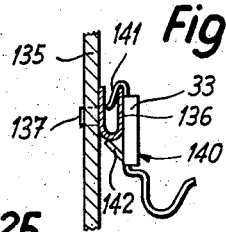
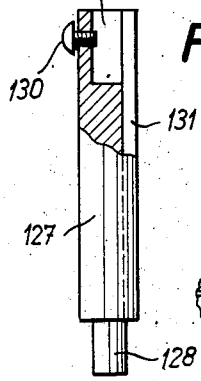
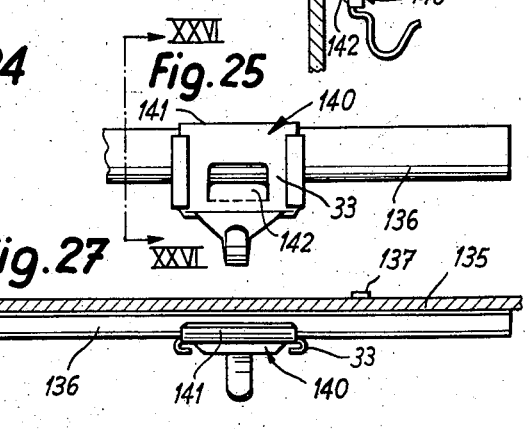
INVENTOR
SCIPIONE ROGER MANZARDO
BY Otto John Munz
ATTY.

United States Patent Office 3,070,235
Patented Dec. 25, 1962

3,070,235
KEY FILING SYSTEM
Scipione Roger Manzardo, Schwanenplatz 4,
Lucerne, Switzerland
Filed Aug. 11, 1958, Ser. No. 754,232
Claims priority, application Switzerland Aug. 13, 1957
12 Claims. (Cl. 211—13)

For the orderly keeping of keys in households, commercial and industrial concerns, administrations, hotels, etc., hitherto racks, panels, cabinets and the like have been used, in which the key hooks have been fixed in horizontal rows. However, as the usual bit and flat keys are known to possess different lengths and also differently large handles, the horizontal and vertical distances apart between the key hooks had to be suited to the greatest of the said dimensions. But since keys of unusual size are exceptions in the total quantity of a key filing system, there resulted a regrettable waste of space which manifested itself all the more, the more extensive the key filing has been.

A primary object of the present invention is to obviate the aforementioned drawback. According to the present invention there is provided a key filing system having at least one panel with a plurality of suspension hooks mounted thereon for the keys, the novelty being that for each key provision is made for its proper suspension element which includes a label-holder, a suspension hook arranged at its lower edge, and at least one supporting or carrier member, say, a resilient clamping part, with the help of which the suspension element is removably and displaceably attached to the panel.

Further features of the invention will appear from the following description and claims, taken in conjunction with the accompanying drawing, wherein there are shown several forms of embodiment incorporating the invention.

In said annexed drawing:

FIG. 1 shows the front view of an arrangement as composed of several identical parts according to a first form of embodiment;

FIG. 2 is a horizontal section taken on the line II—II of FIG. 1;

FIG. 3 is a vertical section taken on the line III—III of FIG. 1;

FIG. 4 shows a front view on a larger scale of a single suspension element for a key, together with a label used for designation;

FIG. 5 is a side view of the same suspension element;

FIG. 6 is a top view of the suspension element of FIG. 4;

FIG. 7 shows in similar representation to FIG. 4 a modified form of the suspension element;

FIG. 8 illustrates in similar representation another form of a suspension element;

FIG. 9 is a side view of the same suspension element as attached to a plate shown in vertical section;

FIG. 10 is a vertical section of a part of a plate adapted for putting on suspension elements according to FIGS. 4 to 7;

FIG. 11 is a side view of a further form of a suspension element as put on a plate shown in vertical section;

FIG. 12 is the similar representation of still other forms of the suspension element and plate;

FIG. 13 shows a front view of a flat key and a cap as stretched over the handle thereof, being fitted with suspension eye and transferable designation plate;

FIG. 14 is a vertical section through the cap of FIG. 13;

FIG. 15 shows a vertical section of a key cabinet, taken on the line XV—XV of FIG. 16;

FIG. 16 is a sectional view on the line XVI—XVI of FIG. 15;

FIG. 17 represents the same key cabinet as opened and in horizontal section on the line XVII—XVII of FIG. 15;

FIG. 21 shows the front view of another embodiment with a key panel made up of several equal parts, together with a frame keeping these parts assembled.

FIG. 22 is a vertical section on the line XXII—XXII of FIG. 21;

FIG. 23 shows a detail in cross-section on the line XXIII—XXIII of FIG. 21, but on a larger scale with respect thereto;

FIG. 24 represents a single side member of the frame according to FIGS. 21 and 22 on a larger scale and partly in longitudinal section;

FIG. 25 shows the front view of a rail with key suspension element clamped thereto;

FIG. 26 shows the lateral view of the suspension element, together with the rail and a plate having the rail fixed thereto, in vertical section on the line XXVI—XXVI of FIG. 25;

FIG. 27 is a top view of the rail and suspension element, the plate or panel having the rail fixed thereto being shown in horizontal section.

Figure 18:
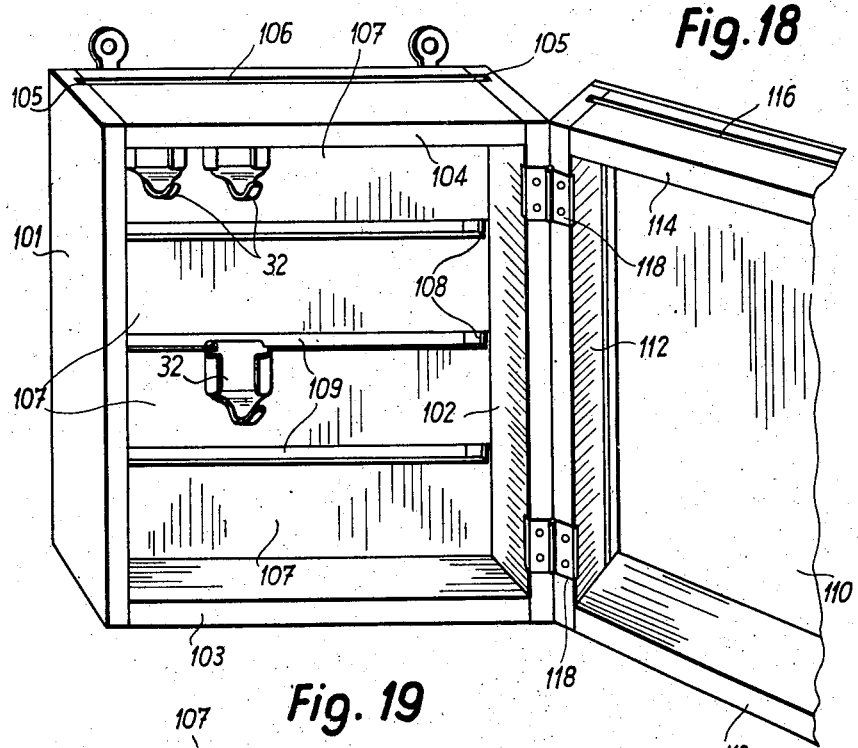
FIG. 18 represents in perspective view another form of embodiment of a key cabinet with door opened.

Referring more particularly to FIGS. 1 through 3, the arrangement for keeping or filing keys comprises similarly designed panels 30 made of sheet-metal plates or other material. Each of said panels is provided with a plurality of horizontal slots 31 arranged in spaced relation one over another. The supports or suspension elements 32 for the keys are removably and displaceably put on the top edge of the panel 30 and on the lower edges of the slots 31. The design of the suspension elements 32 is shown more closely in FIGS. 3 through 6.

Each of the suspension elements 32 includes a body portion or label-holder 33, a suspension hook 34 arranged at the bottom of the label-holder, and a clamping hook or part 35 serving as carrier member. All these parts 33, 34, 35 consist of a single piece of sheet-metal or other suitable material. The clamping part or tab 35 at the back of the holder 33 is bent down hook-shaped, resilient, and adapted to clampingly engage the top edge of the panel 30 or the lower edge of the transverse slots 31 as shown in FIGS. 1 and 2. By the resilient action of the clamping part 35, the panel 30 will be clamped between the clamping part 35 and the back of the label-holder 33 of each suspension element 32. On the hooks 34 of the suspension elements 32 both bit keys and flat keys can be put on, the handles of which have a hole for taking the hook 34, as is usually the case. Into the label-holder 33 a designation strip or plate 36 may be removably and changeably inserted. On the plaque, plate or strip 36 may be put a numeral or other identification mark of the key belonging to the respective suspension element 32.

To suitably identify the keys themselves, it is preferable to have the handle of each key covered with a cap 40 of elastically stretchable material, say, rubber. See FIGURES 13 and 14. The cap 40 is flat and, by reason of its elasticity, may be easily tightened over key handles of any form and size, especially over handles of bit keys and flat keys. At the top the cap 40 has an extension 41 with an eye 42 for engagement by the suspension hook 34. Moreover, said extension 41 has on one side a cam-like projection 43 which permits of easily recognizing the proper inserted position of the key and is particularly adapted, for instance, to be felt in the dark. One flat wall disk of the cap 40 has a pocket 44 with a narrow opening which is accessible from below and into which the designation plate 45 may be removably and changeably inserted. Through a window 46 a portion of the designation plate 45 and a numeral or other identification mark applied thereto is visible. Advantageously, both strips or plates 36 and 45, respectively, of the suspension element 32 and cap 40 of the related key are marked in the same way.

The caps 40 of different keys may have different colors; for instance, the keys of different story of a building or different departments of a factory may be furnished with a cap of a certain definite color in order to distinguish the keys more easily.

The panels 30 are fitted with holding means 50, 51 for a removable and changeable index 52 listing all the keys being kept on the respective panel.

According to FIGS. 1 and 2, two panels 30 arranged in superposed relation are interconnected by two lateral straps 55 which are secured by screws 56 to one panel 30 and/or the other. The same screws 56 are also used for uniting the panels 30 in side-by-side arrangement. Between the panels overlying each other there is a space which permits of clamping the suspension elements 32 to the top edge of the lower panel.

The aforedescribed arrangement involves the great advantage that at all times it may be readily suited to the requirements. The number and arrangement of the suspension elements 32 on each panel 30 may be chosen as desired, for instance so as to permit of easy reference to a certain group of keys, or that as many keys as possible can be hung up on a panel. According to requirements, only a single one of the panels 30 may be used or any number thereof be connected to each other in the desired arrangement as described. The panels 30 may, for instance, be attached to a wall of a building or within a cabinet.

FIG. 7 shows a modified form of a suspension element 60 which is distinguished from the suspension element 32 only in that, in place of a single clamping part 35 there are now provided two smaller clamping parts 61, each bent down at the back of the label-holder 33.

FIGS. 8 and 9 illustrate another form of embodiment of a suspension element 65. In this case, the clamping parts 66 are punched out of the material of the labelholder 33 and bent to the back thereof. The two clamping parts 66 are resiliently disposed one over the other. FIG. 9 also shows how the suspension element 65 is removably put on the panel 67. The two clamping parts 66 resiliently engage the upper and lower edges of a transverse slot 68 in the panel 67, snapping in therebehind. According to FIG. 9, the two longitudinal edges of the slot 68 are offset to the rear, which, however, need not necessarily be the case.

FIG. 10 shows another design of a transverse slot 70 in a panel 71. The longitudinal edge 72 is offset to the front of the slot 70 and to the front of the panel 71, to make it easier to clamp the suspension elements 32 (FIGS. 4–6) or the suspension elements 60 (FIG. 7) to the longitudinal edge 72.

According to FIG. 11, a suspension element 75 is provided with two clamping parts 76 being arranged at the top and bottom of the label-holder 33 and bent to the rear thereof. The two clamping parts 76 resiliently engage the neighbouring longitudinal edges of two slots 77, which are provided in a panel 78, a comparatively slight distance apart.

The suspension element 80 shown in FIG. 12 also has two clamping elements 81 which are disposed at the top and bottom of the label-holder 33. The clamping parts 81 are hook-shaped and embrace two neighboring edges 82 and 83 of two transverse slots 84 and 85. Both said edges 82 and 83 are offset to the front out of the plane of the panel 86. The suspension element 80 can be pushed in longitudinal direction of the slots 84 and 85 onto the edges 82, 83 and be withdrawn therefrom.

In all aforedescribed forms of suspension elements, these can be put on the respective panel singly or independently of each other, and be laterally displaced or withdrawn.

The key cabinet shown in FIGS. 15–17 includes for instance a sheet-metal casing 90 closable by two doors 92 by means of hinges 91. The rear wall 93 of the casing 90, designed as key panel, is provided with a plurality of horizontal slots 94 adapted to enable clamping engagement of suspension elements 32 or 60 or 65. In order to increase the capacity of the cabinet, two additional panels 95 and 96 are provided which are facing each other by their backs and are connected to each other a certain distance apart by means of spacer bolts 97. Each of said panels 95, 96 has several transverse slots 98 adapted to enable clamping engagement of suspension elements 32 or 60 or 65. These elements are put on the sides of the panels 95 and 96, turned away from each other, as shown in FIG. 16. One panel 96 is swivelable about vertical axes as mounted on links 98 being in turn swivelable about other vertical axes and arranged at the top and bottom of the casing 90. Thus, with door 92 opened, it is possible to turn the two panels 95, 96 out of the casing 80 and to swivel them through more than 180 degrees. In this way, easy access may be gained to the suspension elements or keys at the rear panel 96. In FIG. 17 the panels 95, 96 are shown as partially swivelled.

From FIGS. 15–17 it may be seen that the casing 90 is fitted with two pairs of bushings 99, each intended for taking a pin of the links 98. One pair of the bushings 99 is situated at the left and the other at the right sidewall of the casing 90. Thus the links 98 may be selectively supported in the bushings of one pair or the other to permit of the panels 95, 96 being swung out of the casing 90 either to the left or to the right.

The interspace between the two panels 95, 96 may serve for accommodating a key index which, for the user, is substantially hidden from view.

The described key cabinet may be either suspended on a wall or fixed to a wall.

Figure 19:
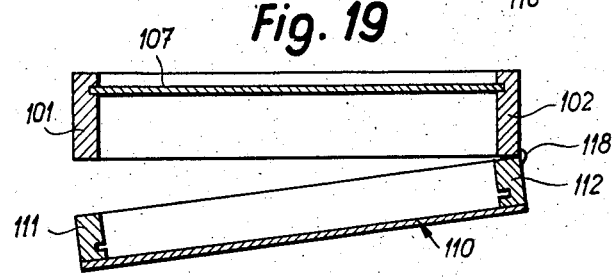
FIG. 19 is a horizontal section of the same cabinet with door half-closed.
Figure 20:
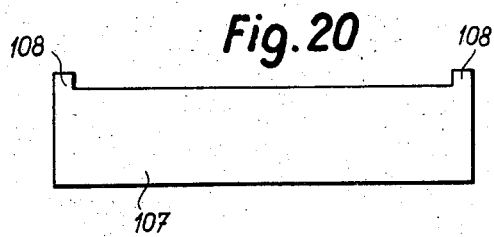
FIG. 20 shows a single one of the members, of which the key panel provided in the cabinet according to FIGS. 18 and 19 is made up.

FIGS. 18 and 19 show another form of embodiment of a key cabinet. The casing thereof chiefly consists of a frame 101–104, say, of wood. The two side battens 101, 102 are each provided with an inside groove 105. The top batten 104 has a throughgoing slot 106 opening with its two ends into said grooves 105. Through the slot 106 a key panel is inserted into the grooves 105, which includes several equal substantially rectangularly shaped parts, each possessing at one edge two projections 108, as shown particularly in FIG. 20. The parts 107 are fitted into the frame 101–104, with the projections 108 pointing upwards. The second and the following members rest with their lower edge upon the projections 108 of the directly underlying member 107 so as to form horizontal slots 109 between the successive members 107, enabling the suspension elements 32 or 60 to clampingly engage the top edge of each member 107.

A door 110 for closing the key cabinet has a frame 111–114 being hinged by means of hinges 118 to the frame 101–104 of the casing. The vertical frame battens 111, 112 are provided with inside grooves 115, and the top batten 114 has a slot 106 opening thereinto. If on the panel, made up of the members 107, there is not enough space for the suspension elements 32 and the keys to be hung up, the capacity of the cabinet may be doubled by inserting through the slot 116 other members 107 of a second key panel which can also take suspension elements for keys.

The described key cabinet is particularly suitable for the household. The subdivision of the key panels into several identical members 107 has the advantage that the same members may also be used for higher cabinets. Alternatively, it is possible to have the individual members 107 dimensioned differently so that the distances apart of horizontal slots 109 may be kept at will to suit the length of the keys to be hung up.

The arrangement shown in FIGS. 21-24 includes a key panel also composed of several members 120. According to FIG. 21, these members 120 are each provided at the bottom with two projections 121 which rest on the top edge of the directly underlying member 120 so as to define a slot 122 between two consecutive members. In addition, each member 120 is provided with a horizontal slot 123. Both the top edges of the members 120 and the bottom longitudinal edges of the slots 123 may have suspension elements 32 or 60 clamped thereto. The members 120 are kept assembled by a frame comprising a bottom stirrup 125, a top stirrup 126 and a plurality of vertical side pieces 127. The latter are all of the same design and agree in length with the vertical dimension of the various members 120 of the panel. Each of the vertical pieces possesses at one end a tenon 128 and at the other end a suitable recess 129. Similarly, the top part 126 has at its stirrup limbs two pins or tenons 128, whereas the bottom part 125 has at its stirrup limbs two recesses 129. The tenons or pins 128 are fitted into the recesses 129 of the neighboring parts 125, 126, 127 and secured from slipping out by means of lateral clamping screws 130. The side pieces 127 and the vertical limbs of the stirrup 125 are provided with a longitudinal groove 131 for engagement by the vertical edges of the panel members 120, as distinctly shown in FIG. 23.

The described arrangement according to FIGS. 21-24 has the advantage that it may be increased at any time by inserting further panel members 120 and lateral pieces 127 as desired, if a large number of keys shall be filed. It is possible to use the system at first with a single panel member 120 only. In such case no lateral pieces 127 are needed and the tenons or pins 128 of the top stirrup 126 are fitted direct into the recesses 129 of the bottom stirrup 125.

If the frame 125-127 is suspended or swivelably mounted in such a way as to render the panel formed of the members 120 accessible from either side, the suspension elements 32 may be put on both sides of the panel, by having them, on one side thereof, clamped to the top edge of the panel members 120, and the suspension elements on the other side clamped to the lower longitudinal edge of the slots 122.

Obviously, instead of manufacturing the frame members 125-127 of solid bar material it is also possible to have them made of tubing.

According to FIGS. 25-27 a panel 135 has attached thereto a horizontal channel section rail 136, in that at one limb of said rail at least two lugs 137 are punched out, which are bent to the rear, stuck through apertures in the panel or plate 135 and bent down on the back thereof. The front channel limb of the rail 136 can take suspension elements 32 or 60 clamped thereto according to FIGS. 4-6 or 7. FIGS. 25-27, however, represent a modified form of a suspension element 140 which includes two clamping parts 141 and 142 in overlying relation. The top clamping part 141 is provided on the label-holder and is bent down hook-shaped to the rear. The other clamping part 142 is formed of a rearwardly bent lug punched out of the material of the label-holder 33 and provided close to the bottom edge of the label-holder 33. To put the described element 140 on the rail 136, the top clamping part 141 is at first placed over the top edge of the front limb of the rail 136, whereupon the back of the label-holder is pressed flat against the rail 136, the other clamping part 142 resiliently engaging behind the substantially semi-cylindric apex of the rail 136. The suspension element 140 may be slid to any place along the rail 136.

Obviously, upon the rail 136 shown a large number of suspension elements may be put, and to the panel 135 a plurality of rails 136 may be attached in spaced overlying relation.

Alternatively, instead of resilient clamping parts, the suspension elements may include other carrier or supporting members, by means of which they are attachable to a panel. For instance, the carrier members could be pliable lugs which are stuck through apertures in the panel and bent down against the back thereof. The panels need not in each case be provided with slots, but could also possess apertures of another shape. It would for instance be possible to have the panel made of a regularly perforated sheet-metal plate, whereby the apertures may be preferably square. For displacing the suspension elements in horizontal or vertical direction, the supporting members thereof should then be brought in engagement with others of the apertures in the panel. The perforated panels of the type mentioned may also be readily engaged by suspension elements with resilient clamping parts such as substantially described herein with reference to the drawings.

In contradistinction to the systems made known as heretofore for filing keys, all described forms of embodiment involve the advantage that the suspension elements for hanging up the keys may at any time be readily put on, displaced or removed as desired, without resorting to any tools whatever. Another advantage is seen in the label-holder 33 taking transferable designation strips. The merits peculiar to the particular forms are already described.

It is understood that the foregoing forms of embodiment may be modified at will and combined with one another without departing from the scope of the appended claims.

What I claim is:

1. In a key file rack, a panel having at least one horizontal slot therein, and a plurality of key hooks each removably fixed through said slot for sliding adjustment to any position therealong, each said hook comprising a body portion, means fixed with said body portion and extending rearwardly out of the plane thereof to resiliently and removably grip said panel in and along said slot, and key-support means fixed with said body portion and extending forwardly from the bottom edge and out of the plane thereof.

2. In a key file rack, a panel having a plurality of vertically-disposed, horizontal slots therein, and a plurality of key supports, each said support comprising a substantially flat body portion, a clamp element fixed with said body portion and extending rearwardly therefrom to resiliently engage an edge of one said slot for yielding sliding adjustment therealong, and a key hook fixed with the bottom edge of said body portion and extending forwardly out of the plane thereof.

3. A key file comprising a panel having therein a plurality of spaced parallel slots, and a plurality of key supports each comprising a body portion, a clamp hook fixed with and extending rearwardly from the top of said body portion to form with said body portion, a clamp frictionally gripping an edge of a respective slot for sliding adjustment to any position therealong, and a key-support hook fixed with and extending forwardly from the base of said body portion, each said key hook being removably supported in its slot.

4. A key file as pointed out in claim 3, said panel comprising spaced parallel members having confronting vertically-disposed channels, and a plurality of rectangular sections removably held in superposed, edge-to-edge relation in and between said channels, each said section having a pair of projections at the end of one edge thereof whereby contiguous edges of adjacent sections define said slots therebetween.

5. In a key filing device, a panel having a plurality of vertically-spaced horizontal slots therethrough, and a plurality of key-support hooks each removably mounted for adjustment to any selected position in and along a slot, each said hook comprising a flat body portion having an integral clamp extending through its slot, then downwardly to the rear of said slot in yieldably slidable gripping engagement with the lower edge thereof, a key-support tab extending from the lower edge of said body portion downwardly, then forwardly and upwardly, the vertical side edges of said body portion being extending forwardly and then inwardly toward each other to form confronting channels adapted to receive a key-identification plaque.

6. In a key index, a panel having a plurality of vertically-spaced horizontal slots, a plurality of key supports, each constructed and arranged to provide a rearwardly projecting portion frictionally gripping said panel in and along a selected one of said slots for sliding adjustment therealong, and a key hook projecting forwardly from the base of each said support.

7. A key index as recited in claim 6, the lower edge of each said slot in said panel being offset forwardly, then upwardly, said rearwardly projecting portion of each said key support, frictionally and removably gripping the upwardly-extending lower edge of its respective slot.

8. A key index as pointed out in claim 6, at least one longitudinal edge of each said slot having a flange extending rearwardly substantially normal to the plane of said panel, each said rearwardly projecting portion yieldingly and frictionally gripping said flange.

9. In a key support for removable positioning on a slotted panel, a body portion, a clamping hook comprising a tab fixed with the upper edge of said body portion and extending rearwardly, then downwardly therefrom to define, with said body portion, a hook adapted to frictionally and removably grip the lower edge of a slot in the panel, a key hook comprising a tab fixed with the lower edge of said body portion and extending downwardly, then forwardly and upwardly, and means integral with the side edges of said body portion and forming a pair of horizontally-spaced confronting vertical guide channels for a key identification plaque, said key hook being constructed and arranged as an abutment limiting downward movement of a plaque in and between said channels.

10. The combination with a plurality of key supports as recited in claim 9, of a flat sheet metal panel having a plurality of horizontal, vertically-spaced slots therein, the clamping hook of each said key support extending over and about and frictionally gripping the lower edge of a respective one of said slots for longitudinal sliding adjustment therealong.

11. In a key support for removable adjustable attachment to a panel having a horizontal slot, a flat body portion, a clamping hook integral with the top of said body portion and extending rearwardly out of the plane of said body portion, then downwardly to form a hook adapted to frictionally grip the lower edge of the slot in the panel, for adjustment therealong, a key hook integral with the bottom of said body portion and extending therefrom, forwardly out of the plane of said body portion, then downwardly, then upwardly and forwardly, and means integral with the sides of said body portion defining inwardly-facing confronting vertically-disposed channels receiving and holding a key-identification plaque, downward movement of said plaque being limited by engagement thereof with the forwardly-extending portion of said key hook.

12. In a key support for removable adjustable attachment to a panel having a horizontal slot, a one-piece item of sheet material comprising a planar generally rectangular body position, a clamping hook projecting rearwardly from the top edge of said body portion, out of the plane thereof, thence downwardly to define a hook adapted to frictionally and slidably engage the lower edge of a slot of the panel, a key hook projecting forwardly out of the plane of said body portion, thence downwardly, thence forwardly and upwardly, the side edges of said body portion extending forwardly and inwardly to define confronting vertical channels into which a key-identification plaque may be vertically slid from above, downward movement of the plaque within said channels being limited by the forwardly projecting portion of said key hook.

References Cited in the file of this patent

UNITED STATES PATENTS

| | | |
|---|---|---|
| 950,006 | McCarty | Feb. 22, 1910 |
| 956,175 | Rieckhoff | Apr. 26, 1910 |
| 1,740,048 | Thayer | Dec. 17, 1929 |
| 1,742,542 | Howell | Jan. 7, 1930 |
| 1,880,089 | Heidecorn | Sept. 27, 1932 |
| 1,892,500 | Bleckley | Dec. 27, 1932 |
| 1,948,738 | Thayer | Feb. 27, 1934 |
| 2,047,097 | Dunbar | July 7, 1936 |
| 2,347,035 | Douglas | Apr. 18, 1944 |
| 2,626,713 | Peacock | Jan. 27, 1953 |

FOREIGN PATENTS

| | | |
|---|---|---|
| 359,756 | Italy | July 4, 1938 |